US012024855B2

United States Patent
Huntley et al.

(10) Patent No.: US 12,024,855 B2
(45) Date of Patent: Jul. 2, 2024

(54) WIRE INSTALLATION TOOL

(71) Applicant: Thomas Huntley, Auburn Hills, MI (US)

(72) Inventors: Thomas E. Huntley, Auburn Hills, MI (US); Joseph Andrew Huntley, Greenville, SC (US); Clayton J. Winkler, Oakland Township, MI (US)

(73) Assignee: Thomas Huntley, Auburn Hills, MI (US)

( * ) Notice: Subject to any disclaimer, the term of this patent is extended or adjusted under 35 U.S.C. 154(b) by 59 days.

(21) Appl. No.: 17/683,740

(22) Filed: Mar. 1, 2022

(65) Prior Publication Data

US 2022/0282449 A1 Sep. 8, 2022

Related U.S. Application Data

(60) Provisional application No. 63/155,425, filed on Mar. 2, 2021.

(51) Int. Cl.
*H02G 1/06* (2006.01)
*E02F 5/10* (2006.01)

(52) U.S. Cl.
CPC .............. *E02F 5/102* (2013.01); *H02G 1/06* (2013.01)

(58) Field of Classification Search
CPC .. A01B 3/02; H02G 1/06; H02G 1/085; E02F 3/02; E02F 5/102
See application file for complete search history.

(56) References Cited

U.S. PATENT DOCUMENTS

| | | | | |
|---|---|---|---|---|
| 2,014,456 A * | 9/1935 | Smith | ...................... | A01B 3/02 |
| | | | | 172/671 |
| 3,066,491 A * | 12/1962 | Ryan | ...................... | E02F 5/102 |
| | | | | 405/177 |
| 3,326,010 A * | 6/1967 | Gagne | ...................... | H02G 1/06 |
| | | | | 172/699 |
| 3,561,222 A * | 2/1971 | Sweeton et al. | ........ | E02F 5/102 |
| | | | | 37/370 |
| 3,659,426 A * | 5/1972 | Caldwell | ................. | E02F 5/102 |
| | | | | 172/699 |
| 3,927,536 A * | 12/1975 | Sprenkel | ................. | E02F 5/102 |
| | | | | 405/183 |
| 4,040,261 A * | 8/1977 | Schuck | ...................... | E02F 5/14 |
| | | | | 172/40 |
| 4,395,959 A * | 8/1983 | Dale | ................... | A01M 21/043 |
| | | | | 405/183 |
| 4,537,531 A * | 8/1985 | Diefenthaler | ............. | E02F 5/08 |
| | | | | 405/174 |
| 4,661,019 A * | 4/1987 | McLaughlin | ........... | E02F 5/104 |
| | | | | 405/174 |
| 4,904,116 A * | 2/1990 | Hesse | ..................... | E02F 5/027 |
| | | | | 405/181 |

(Continued)

*Primary Examiner* — Benjamin F Fiorello
(74) *Attorney, Agent, or Firm* — BROOKS KUSHMAN P.C.

(57) ABSTRACT

An in-ground wire installation tool including a body having a concave-shaped side with a pointed edge; an opposing side including a channel configured to dispense a wire, the concave-shaped side and the opposing side being connected via a top portion and a bottom portion, the top portion including an attachment portion configured to house a shaft; and the bottom portion connecting the concave-shaped side and the channel, the bottom portion including a blade.

20 Claims, 9 Drawing Sheets

(56) References Cited

U.S. PATENT DOCUMENTS

| | | | | |
|---|---|---|---|---|
| 5,281,054 A | * | 1/1994 | O'Riordan | E02F 5/14 |
| | | | | 405/182 |
| 6,260,631 B1 | * | 7/2001 | Torrez | H02G 1/06 |
| | | | | D8/11 |
| 6,637,978 B1 | * | 10/2003 | Genta | E02F 5/12 |
| | | | | 405/174 |
| 6,698,979 B1 | * | 3/2004 | Ambrose | H02G 1/085 |
| | | | | 37/367 |
| 7,637,697 B1 | * | 12/2009 | Holland | E02F 5/00 |
| | | | | 405/177 |
| 2004/0238190 A1 | * | 12/2004 | Ramsay | A01B 15/025 |
| | | | | 172/681 |
| 2014/0334882 A1 | * | 11/2014 | Gale | A01C 7/02 |
| | | | | 172/381 |
| 2015/0125218 A1 | * | 5/2015 | Gustavsson | E02F 5/145 |
| | | | | 405/175 |

* cited by examiner

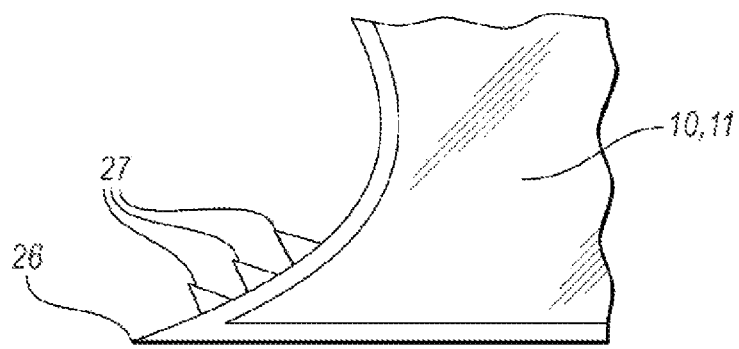
FIG. 6A
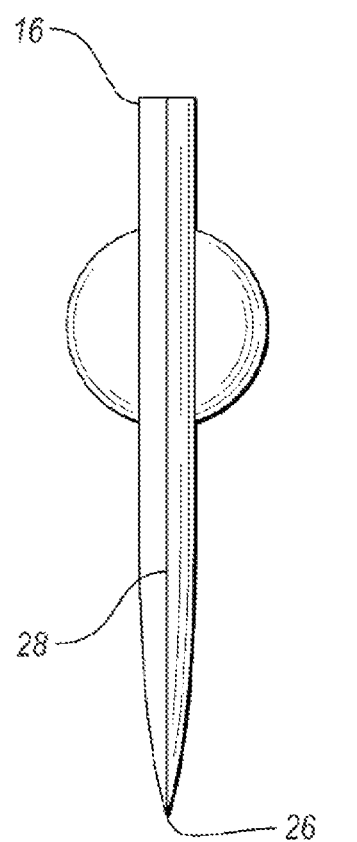 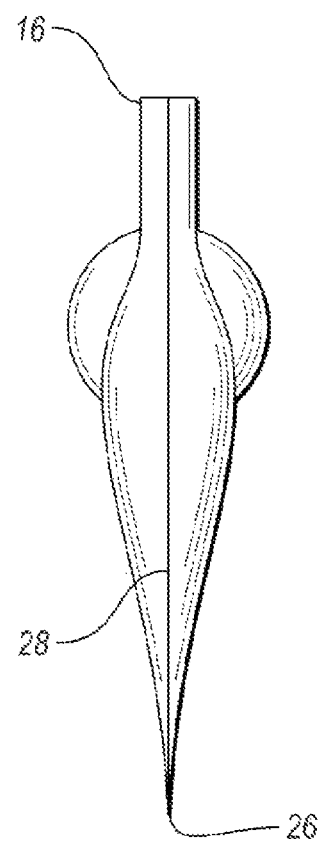
FIG. 7A         FIG. 7B

WIRE INSTALLATION TOOL

CROSS-REFERENCE TO RELATED APPLICATIONS

This application claims the benefit of U.S. provisional application Ser. No. 63/155,425 filed Mar. 2, 2021, the disclosure of which is hereby incorporated in its entirety by reference herein.

TECHNICAL FIELD

The disclosure relates to a mechanical device arranged to install a wire in the ground and a method of using the same.

BACKGROUND

Outdoor lighting and invisible fences require in-ground wire installation. Different installation methods have been developed using various tools and equipment. Professional in-ground wire installation is typically expensive. To avoid the cost associated with professional equipment and installation, various methods have been developed for non-commercial purposes aimed at individuals interested in do-it-yourself (DIY) installation. But the DIY methods are typically very time-consuming, impractical, and may require different approaches, depending on the type of the terrain.

SUMMARY

In at least one embodiment, an in-ground wire installation tool is disclosed. The tool may include a body having a fin-shaped side with a pointed edge, an opposing side including a channel for dispensing a wire, a top portion including at attachment portion configured to receive a shaft, and a bottom portion connecting the fin-shaped side and the channel. The tool may further include a wire assembly, attachable to the top portion, from which the wire may be dispensed.

In another embodiment, an in-ground wire installation tool is disclosed. The tool may include a body having a concave-shaped side with a pointed edge. The tool may also include an opposing side including a channel configured to dispense a wire. The concave-shaped side and the opposing side may be connected via a top portion and a bottom portion. The top portion may include an attachment portion configured to house a shaft. The bottom portion may connect the concave-shaped side and the channel. The bottom portion may include a blade. The attachment portion may be immediately adjacent to the channel. The channel may be a curved elongated channel. The attachment portion may include a screw-thread. The body may be fin-shaped. The blade may run along an entire length of the bottom portion. The channel may have a rectangular cross-section. The tool may further include a wire assembly configured to dispense a wire. The wire assembly may be attachable to the top portion.

In yet another embodiment, an in-ground wire installation tool is disclosed. The tool may include a body having a top portion, a bottom portion, a first side terminating in a blade, and a second side. The second side may be located opposite the first side. The second side may have a channel configured to dispense a wire. The body may be configured to receive a shaft for driving the tool. The bottom portion may be disposed between the first side and the second side. The tool may further include a wire assembly attachable to the body for dispensing the wire. The body may include an attachment portion configured to receive the shaft. The body may include a rim having a greater thickness than the rest of the body. The channel may run from the bottom portion towards the top portion. The side terminating with a blade may include a curvature.

In an alternative embodiment, an in-ground wire installation tool is disclosed. The tool may have a body having a top portion, a bottom portion, a first side having a blade, and a second side. The second side may be located opposite the first side. The second side may have a channel originating at the bottom portion and terminating at the first side. The channel may be configured to dispense a wire. The body may include an attachment portion. The attachment portion may be located in the top portion. The attachment portion may be configured to receive a shaft for driving the tool. The bottom portion may connect the first side and the second side. The channel may be an elongated straight channel. The attachment portion may be located above the channel. The first side may have a sharp edge along its length. The tool may further include a sleeve insertable into the channel. The sleeve may include a securing mechanism adapted to lock the sleeve in a position once inserted in the channel.

BRIEF DESCRIPTION OF THE DRAWINGS

FIG. 6A shows a detailed view of the end point 26 depicted in FIG. 1A;

FIGS. 7A and 7B show bottom views of non-limiting examples of the bottom portion of the tool;

DETAILED DESCRIPTION

Figure 1A:
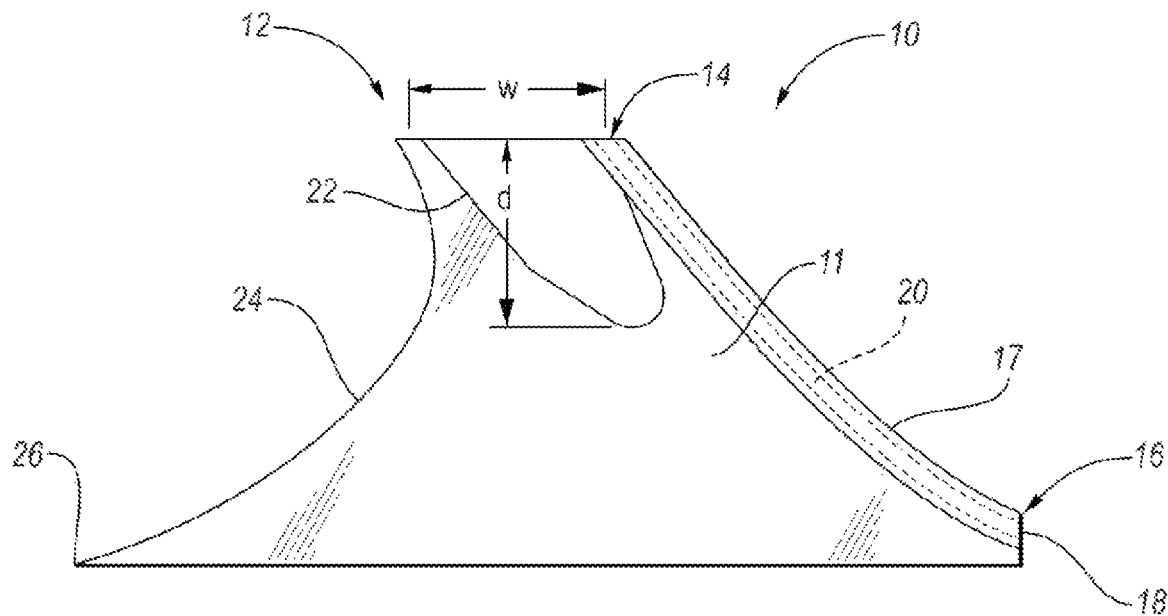
FIG. 1A depicts a side view of a non-limiting example of a wire-inserting tool disclosed herein.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the disclosure can be obtained within a range of +/−5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. Any two numbers, of a set of numbers, may form an integer range. For example, if the disclosed numbers are 1, 2, 3, 4, 5, the range the numbers cover may be 1 to 5, 1 to 3, 2 to 4, 3 to 4, among other options.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The term "one or more" means "at least one" and the term "at least one" means "one or more." The terms "one or more" and "at least one" include "plurality" as a subset.

To improve curb appeal, property owners typically install outdoor lighting to illuminate certain parts of their properties. Similarly, property owners may choose to install a so called invisible or electric fence around their property to keep their companion animals such as dogs within the property boundaries. To install the outdoor lighting and the electric fence, typically, an electric wire needs to be installed in the flower beds and/or under the sod.

Those involved in these home improvement projects are largely split into two subgroups: professionals and homeowners who like to do the work themselves. Homeowners who view themselves as "Do-It-Yourselfers," or DIYers, may rely on their own skills to execute a project. Conversely, professionals are often called upon to perform services that involve acquired skills which homeowners may not possess, a considerable amount of manual labor, and/or the use of expensive or highly specialized equipment that may be challenging to operate.

Recently, there has been a proliferation of tools and techniques that appeal to DIYers because they make it possible for homeowners to add value to their property with a relatively small investment of time and money and achieve results that equal, or perhaps even surpass, results of work done by professionals. More specifically, the growing acceptance of electric pet barriers, and the transition from high-voltage to low-voltage landscape lighting systems have increased the interest of DIYers who see great value in having the ability to design and install these types of subterranean wire-based systems themselves.

The installation of an in-ground antenna for a pet containment system is one of such arenas of DIYers' interest. Since the flow of electric current through this antenna has a relatively low and safe voltage or amperage, there is little risk that an error in installation technique might put others at risk of a severe shock.

Yet, to date, little has been done to either simplify or lower the cost of burying the antenna of an electric pet containment system. DIYers in this consumer segment have the choice of using either a shovel or spade, or they may opt to rent a motorized device for a period of time needed to do the work.

Those who consider renting a motorized cable installer are confronted with additional costs and effort associated with renting the machine and transporting it to the work location.

Cable installations for the purpose of creating a lighted outdoor landscape are only slightly more involved than the installation of an animal containment antenna. A low-voltage lighting circuit uses a wire that is designed to carry sufficient electricity to power a circuit so the gauge of the landscape wire is much larger than a pet containment antenna wire. Also, since the lighting circuit is a parallel (not series) design, two wires are molded into a single insulating cover. While these differences make the size and weight of the landscape wire much greater, the basic concept of burying the wire under the ground's surface remain about the same for both applications. Just like with the animal containment enclosure, the installation is typically very time consuming and requires many different process steps and techniques.

For example, the typical installation may require cutting a trench through the sod with a tool such as a pick axe, separating and removing portions of the sod with a spade, removing a layer of the soil under the sod to expose the trench, forcing the wire into the trench while ensuring that the appropriate amount of wire is inserted in the trench, packing the soil over the wire to keep the wire in the trench, placing the previously dug-up soil over the trench, replacing the sod, and watering the same.

Thus, there is a need for a relatively simple, inexpensive installation tool and a universal method for electric wire in-ground installation.

In one or more embodiments disclosed herein, a wire installation tool is disclosed. The tool may be an inserter. The tool may be an in-ground, under-ground, or subterranean installation or inserter tool. The tool may be a device for placement of a wire such as an electrical wire in-ground or under-ground. The terms "in-ground" and/or "under-ground" may relate to a depth of several inches below the terrain surface or to a position relatively near the surface of the terrain. The depth may relate to about 0.5 inches (1.27 cm) to 5 inches (12.7 cm), 1 inch (2.54 cm) to 4 inches (10.16 cm), or 1.5 inches (3.81 cm) to 2.5 inches (6.35 cm) below surface.

The wire may be a wire or a cable. The terms "wire" and "cable" are used interchangeably. The wire may relate to a strand, a single electric conductor, multiple conductors, or a group of wires. The wire or wires may include a casing or a protective sheath. The wire may be an electric wire or a wire designed to conduct electricity. The wire may have a variety of sizes. The wire gauge may be, for example, 6, 8, 10, 12, or 14. The wire may be connected as antennae to a remotely positioned transmitter. The wire may be an antenna. The wire may carry radio signals that interact with a receiver. The receiver may be a receiver worn by an animal. The wire may carry electrical power used to illuminate one or more lamps used for exterior lighting of a landscape.

Figure 1B:
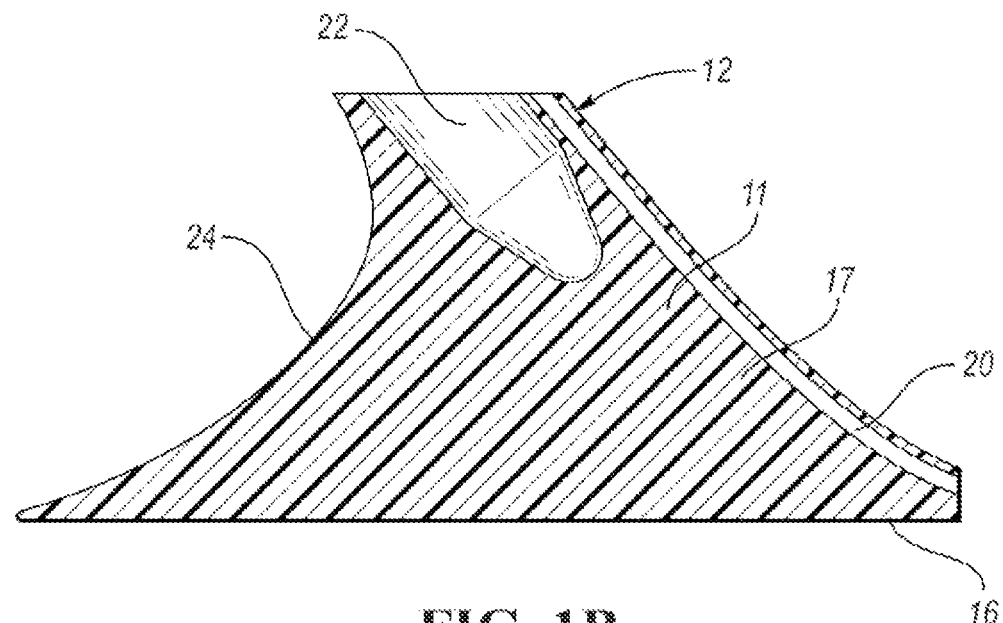
FIG. 1B depicts a cross-sectional view of the tool shown in FIG. 4 along the lines A-A.

A non-limiting example of the tool 10 is depicted in FIGS. 1A and 1B. The tool 10 has a body 11. In at least the illustrated embodiments, the body includes a top portion 12, a bottom portion 16, and sides 17 and 24 extending between and connecting the top and bottom portions. The top portion 12 may have a first opening 14. The first opening 14 may be configured to accommodate a wire passing from the top portion 12 of the tool 10 to the bottom portion 16 of the tool 10. The bottom portion 16 of the tool may have a second opening 18. The first and second openings 14, 18 may define the beginning and ending points of a channel 20 via which the wire may be led. The channel 20 may be located on the side 17 of the body 11. The channel 20 may extend from the top portion 12 to the bottom portion 16, alongside the length of the side 17. The channel 20 may extend for a portion or the entire length of the side 17. The side 17 with the channel 20 forms the back side of the tool 10.

Figure 1C:
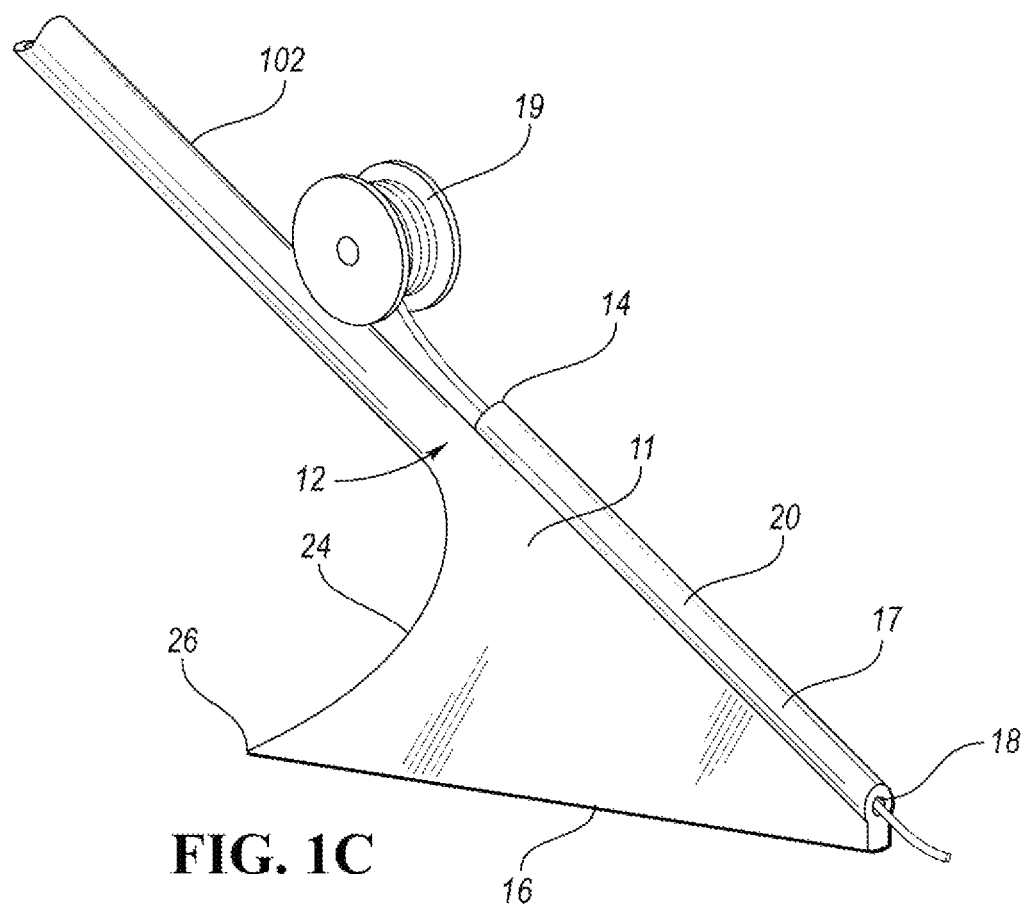
FIG. 1C shows another non-limiting example of the tool disclosed herein.
Figure 1D:
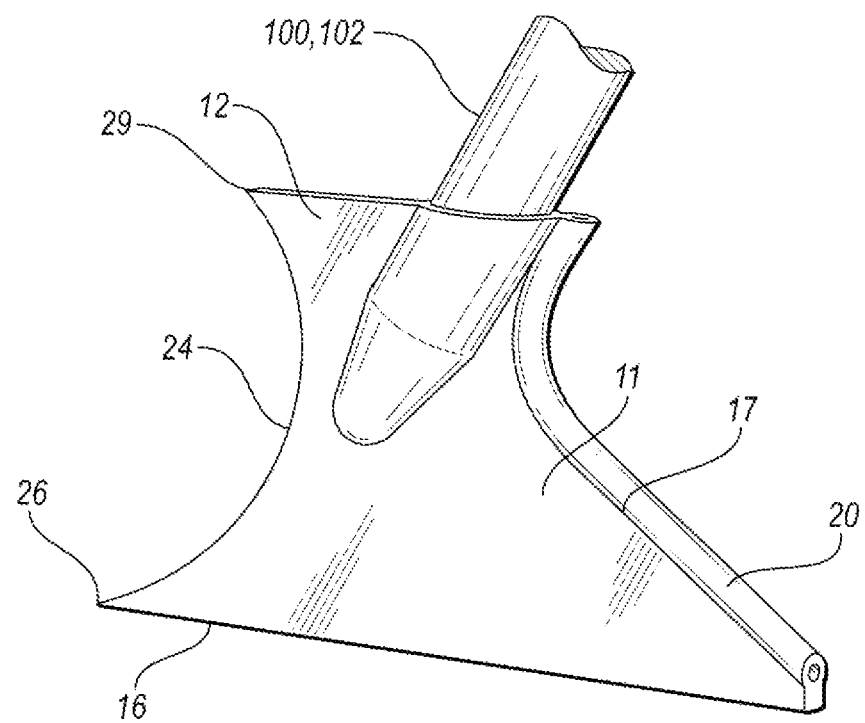
FIG. 1D depicts a side perspective view of another non-limiting example of the tool disclosed herein having a curved channel.
Figure 1E:
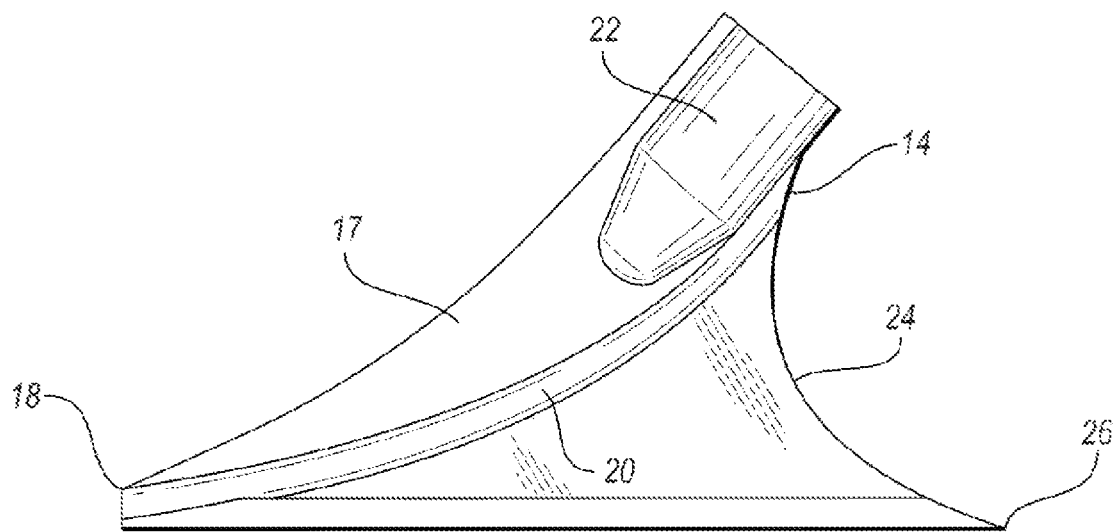
FIG. 1E shows a side view of a non-limiting example of the tool having an alternative placement of the curved channel.
Figure 1F:
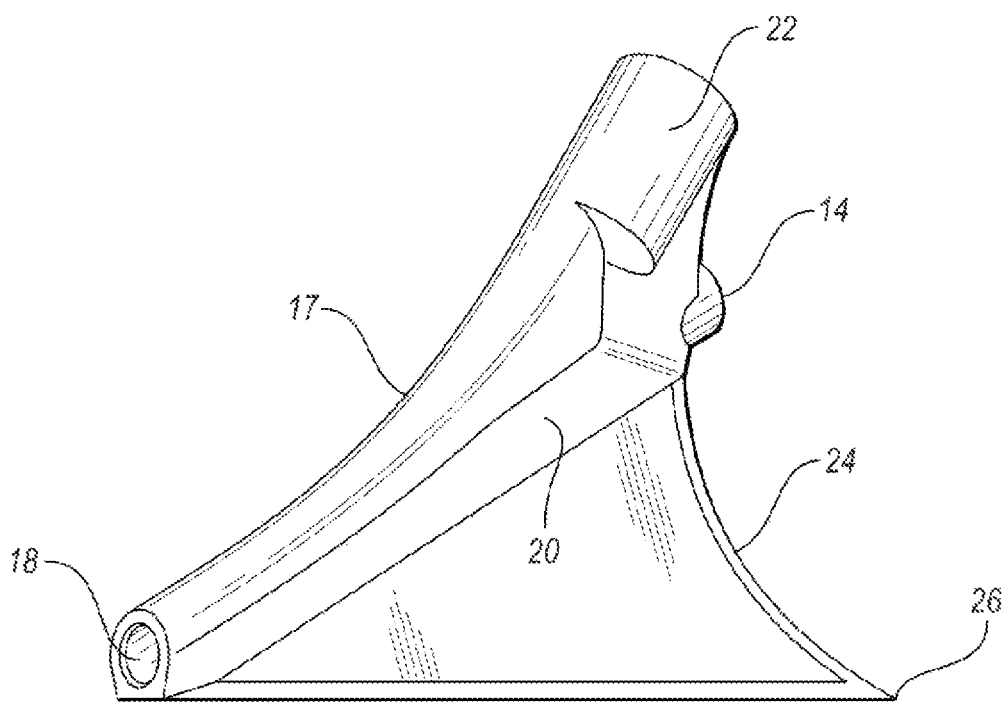
FIG. 1F depicts a perspective side view of a non-limiting example of the tool having an alternative placement of the straight channel.

In another embodiment, the channel's first opening 14 may be located on the opposite side from side 17, that is on side 24 or the guide portion. Such arrangement may provide alternative accommodation for the attachment portion 22 discussed below. A non-limiting example of such embodiment is shown in FIGS. 1E and 1F. The channel 20 may be straight or have a curved shape between the first and second openings 14, 18.

The opening 14 of the channel 20 may be located beneath, below, or under the attachment portion 22. The opening 14 may be located at least partially above the attachment portion 22. The opening 14 may be located adjacent, immediately adjacent to, or be spatially removed from the attachment portion 22. The opening 14 may be located in the top or central portion of the side 17 or 24. The opening 14 may be located at, at least, at most ½, ¼, ⅛, 1/16, or ⅓ distance between the upper-most part of the tool 10 and the tip 26.

Figure 2A:
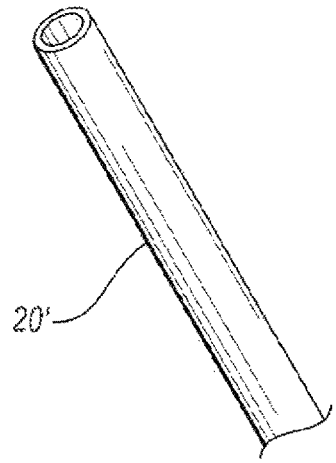
FIGS. 2A and 2B show non-limiting examples of the wire-leading channel of the tool disclosed herein.
Figure 2B:
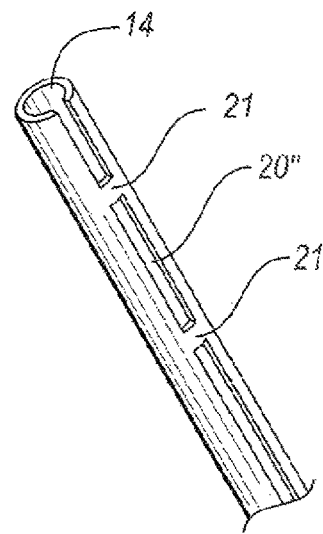

The channel 20 may have any suitable configuration, and for instance may be a tunnel, artery, canal, chamber, conduit, duct, groove, passage, tube, or the like. Two example embodiments of the channel 20 are shown in FIGS. 2A and 2B. The channel 20', depicted in FIG. 2A, may be enclosed, resembling a tube. The wire may be enclosed in the tube after passing through the opening 14. Alternatively, the channel 20", depicted in FIG. 2B, may be open on one side, such as is shown in the illustrated embodiment. The opening may be partial or full. The opened channel 20" may resemble a groove. The wire may be partially exposed in the channel 20". The groove 20" may feature one or more bridges 21 leading from one side of the channel 20" to the other side of the channel 20". The bridges 21 may be configured to keep the wire within the channel 20". The bridges may be absent such that the channel 20" is bridge free.

Alternatively, instead of a channel 20, the side 17 may include a groove with one or more bridges extending over the groove. For example, a first groove may be in the point of opening 14, a second groove may be located in the point of opening 18. Additional grooves may be located randomly- or regularly-spaced between the points 14 and 18. In such embodiment, the wire is exposed, but kept within the groove by means of the one or more bridges. The number of bridges may be 2, 3, 4, 5, 6, 7, 8, 9, 10, or more.

Figure 8:
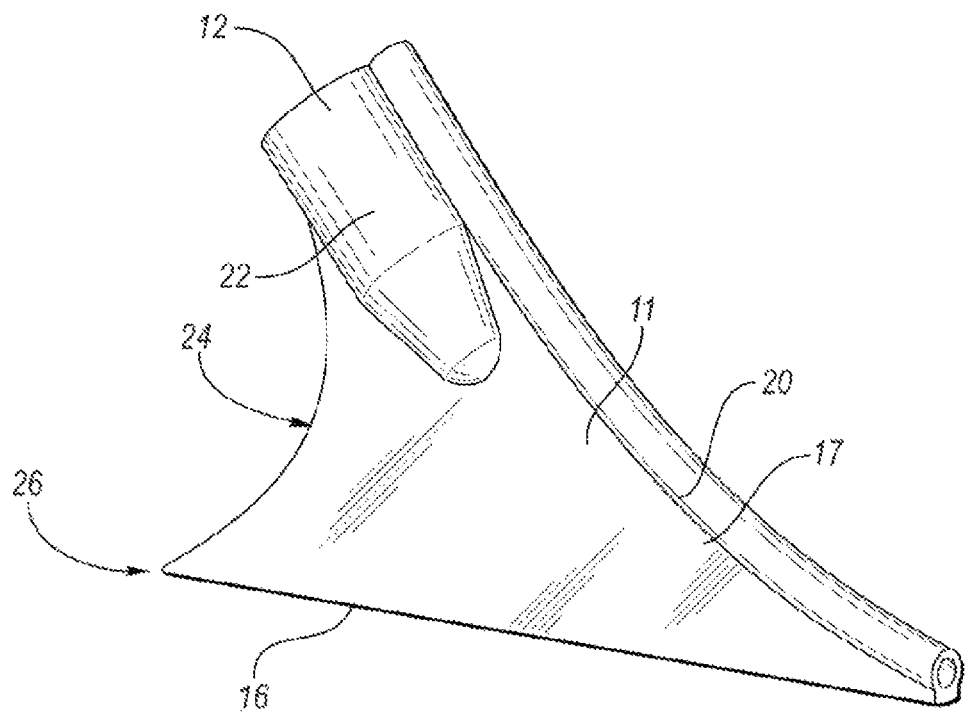
FIG. 8 shows a perspective side view of a non-limiting example of the tool disclosed herein.
Figure 9:
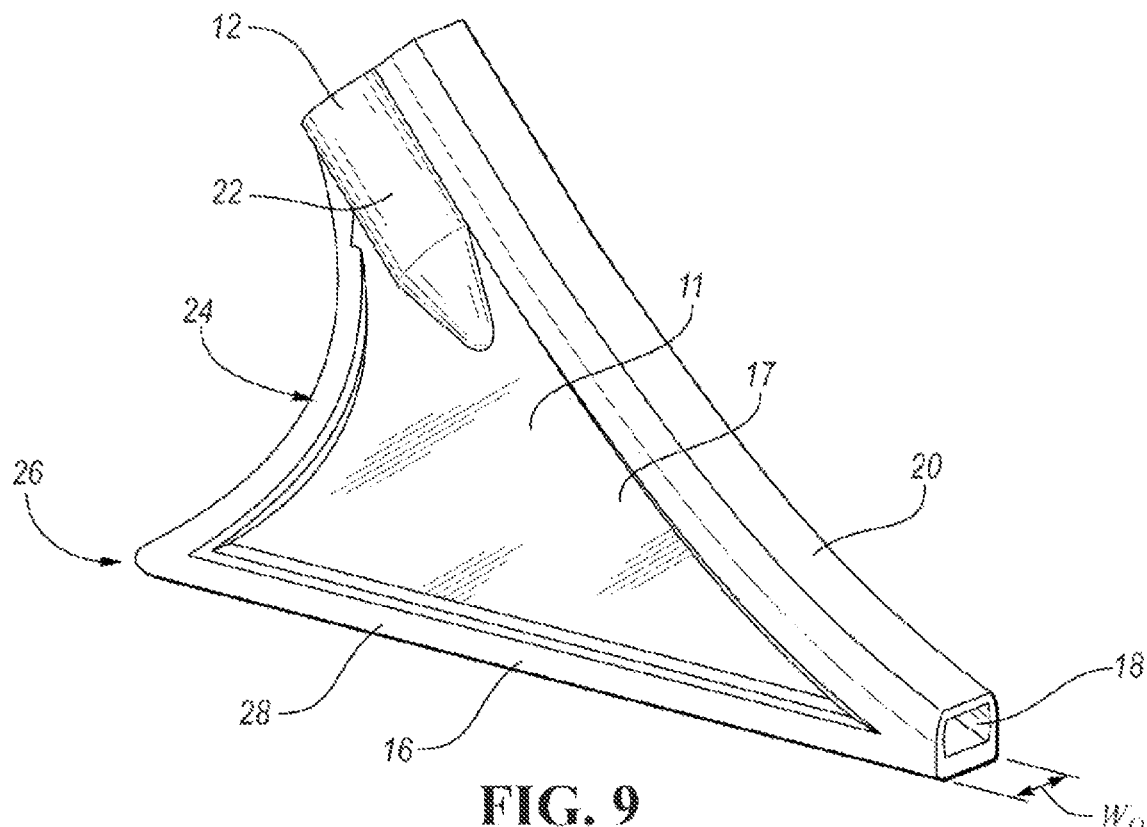
FIG. 9 shows a perspective side view of a non-limiting example of the tool disclosed herein.

The channel 20 may have any suitable cross-section, such as a circular, square, rectangular, annular, or regular cross-section. An example of a circular cross-section is shown in FIG. 8. An example of a rectangular cross-sectional is shown in FIG. 9. The channel's cross-section, dimensions, or both may be designed to accommodate different wires or more than one wire. The channel 20 may include an internal thread or screw-thread. The channel 20 may be enclosable with a cap, lid, or another closing portion 15.

The channel 20 may be generally straight, as is shown for example in FIG. 1A, 8, or 9. Alternatively, the channel 20 may be curved. A non-limiting example of a curved channel 20 is shown in FIG. 1D. The curvature may have any angle as long as the wire can pass through the channel 20 relatively unobstructed. A different curvature is shown in FIG. 1E. The curved channel may have a shape of an S curve, logarithmic curve, exponential curve, sigmoid curve, power curve, hill equation curve, or the like. The channel 20 may be linear, parabolic, or the like.

The channel 20 may form an integral part of the tool 10. The channel 20 and the tool 10 may be free of any seams, seals, connections. The channel 20 may be manufactured as a unitary part of the tool 10.

Figure 10:
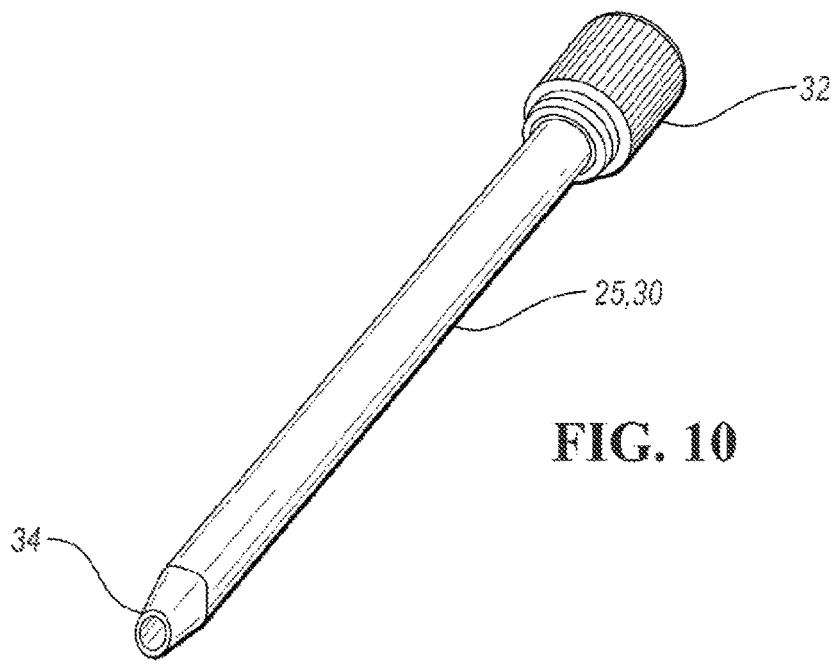
FIG. 10 shows a non-limiting example of an adapter insertable in the tool's channel.

The channel 20 may include an adapter 25. The adapter 25 may enable use of wires with different dimensions. A non-liming example of the adapter is a sleeve 25. The sleeve 25 may form a flexible or rigid tube, which may be structured as a liner for the channel 20. The sleeve 25 may be fixed or removable. The sleeve may be insertable in the channel 20. FIG. 10 shows a non-limiting example of the sleeve 25. The sleeve may have an elongated body 30 terminating in a proximal end 32 and a distal end 34. The body 30 may be hollow, having a diameter larger than a diameter of the wire designed to pass through the sleeve 25, but smaller than the diameter of the channel. Various sleeves may be implemented to accommodate a need for different wire diameters in one or more applications. Installation of the sleeve 25 within the channel 20, or its removal from the channel 20, enables flexibility with respect to the size and number of wires to be installed.

Figure 11:
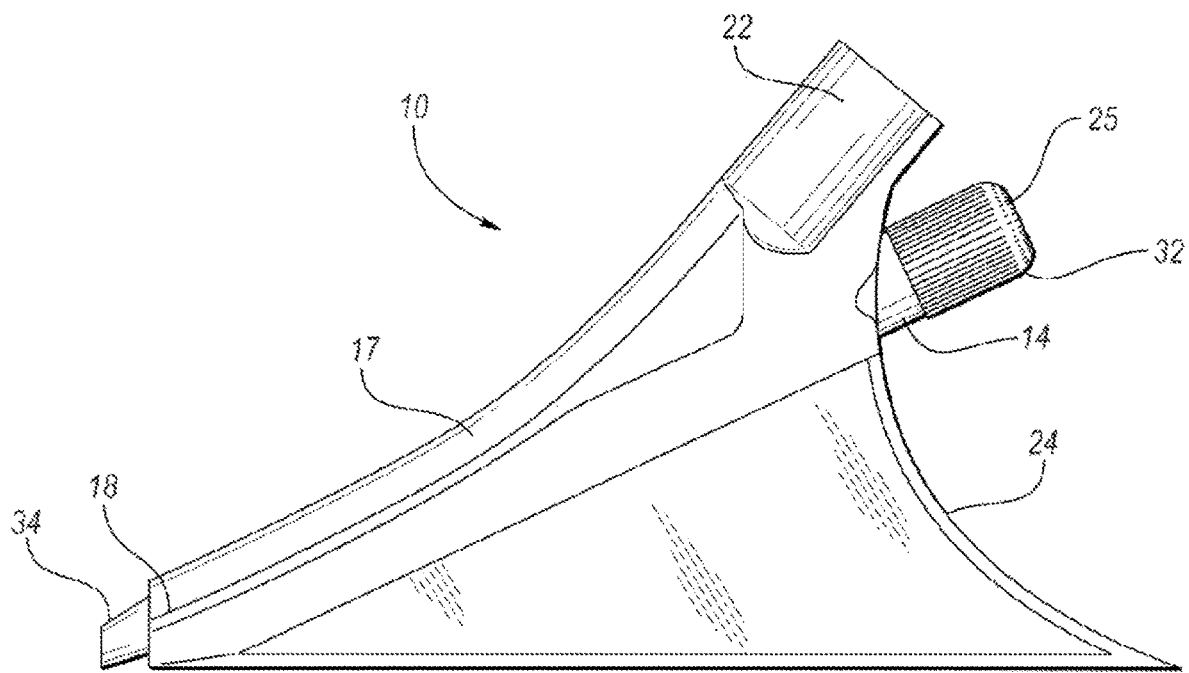
FIG. 11 shows a non-limiting example of the adapter inserted within the tool's channel.

When inserted in the channel 20, the distal end 34 may be flush with the opening 18 of the channel 20. Alternatively, the distal end 34 may extend beyond the opening 18, as is shown in FIG. 11. The proximal end 32 may have greater dimensions such as a diameter than the remainder of the sleeve 25. The proximal end 32 may be configured as a stopper, preventing the sleeve 25 from sliding through the channel 20. The proximal end may be structured to secure the sleeve 25 within the channel 20. For example, the sleeve 25 may include a bulky portion with a diameter greater than the diameter of the opening 14. When the proximal end 32 comes in contact with the opening 14, the sleeve 25 cannot proceed any further, and the sleeve 25 is secured in its position. The securing may be also due to gravitation forces, a locking mechanism, or both. The proximal end may include a locking mechanism, for example a threaded interior matching a thread of the opening 14. The proximal end 32 may include one or more ridges or another grip surface for easy handling.

The sleeve 25 may be insertable in a channel 20 of any shape. For example, the sleeve 25 may be sufficiently flexible to accommodate a channel 20 having a curvature. Alternatively, the sleeve 25 may be rigid or flexible to accommodate a straight channel 20. A non-limiting example of the tool 10 with the sleeve 25 inserted within the channel 20 is depicted in FIG. 11. As can be seen in FIG. 11, the sleeve's 25 distal end protrudes from the opening 18 and extends beyond the opening 18. The length of the sleeve 25 is thus greater than the length of the channel 20. The securing mechanism at the proximal end 32 of the sleeve 25 is shown at opening 14.

Figure 3:
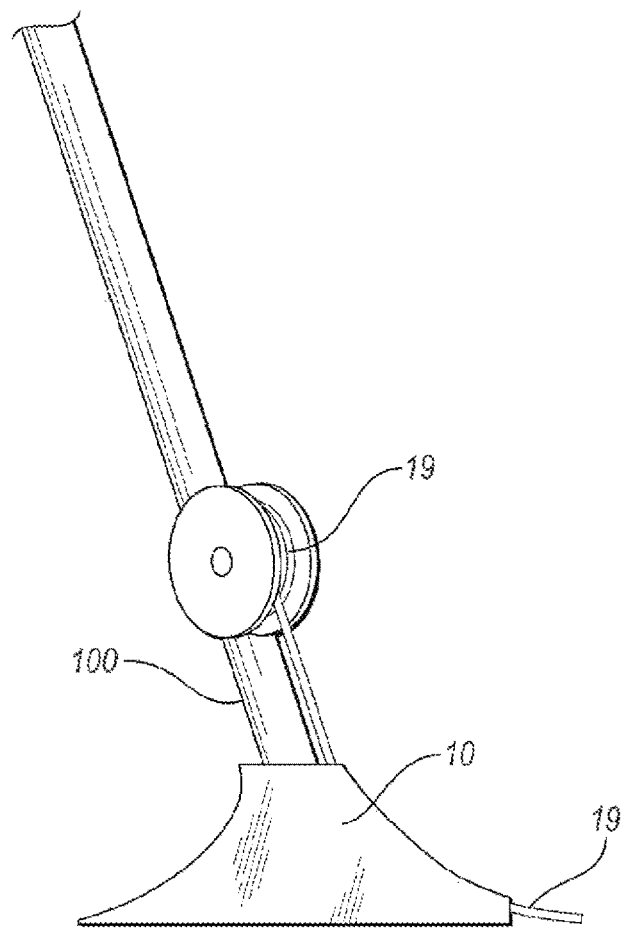
FIG. 3 shows the wire-installing tool with a wire assembly and a second tool.

The tool 10 may include a wire assembly 19, schematically depicted in FIG. 3. In one or more embodiments, the tool 10 may include one or more wire assemblies 19 such as 2 or 3 wire assemblies, each carrying different or the same type of wire. The wire assembly 19 may include one or more spools, one or more wire dispensers, one or more wires, one or more holders, hardware such as nuts, bolts, the like, or a combination thereof. The wire assembly 19 may be configured as a source, or potential source, of wire(s) the tool 10 is arranged to deposit in the ground. The wire assembly 19 may be attachable, removable, or permanently attached to the tool 10. The wire assembly 19 may be temporarily or permanently attached to one or more portions of the tool 10. For example, the wire assembly 19 may be attached to the top portion 12, the side 17, the side 24, or a combination thereof. Alternatively, the wire assembly 19 may be attachable or attached to another object besides the tool 10, for example to a shaft 102 or another object 100 inserted or attached to the tool 10, for example via an attachment portion 22 described below. The wire assembly 19 may be attached via hardware such as nut(s), bolt(s), bracket(s), the like, or a combination.

The wire assembly 19 is configured to provide a wire to be buried in the terrain via the tool 10. The wire originates in the wire assembly 19 having a fixed end and a free end. The fixed end is located in the wire assembly 19. The free end of the wire is configured to enter the first opening 14 of the channel 20, continue in a gravitational, downward direction via the channel 20 to the second opening 18, and exit via the second opening 18 at the level of the bottom portion 16 of the tool 10. The free end of the wire is then ready for installation in the ground. The free end unwinds from the wire assembly 19 as the wire is being dispensed into the ground.

Figure 4:
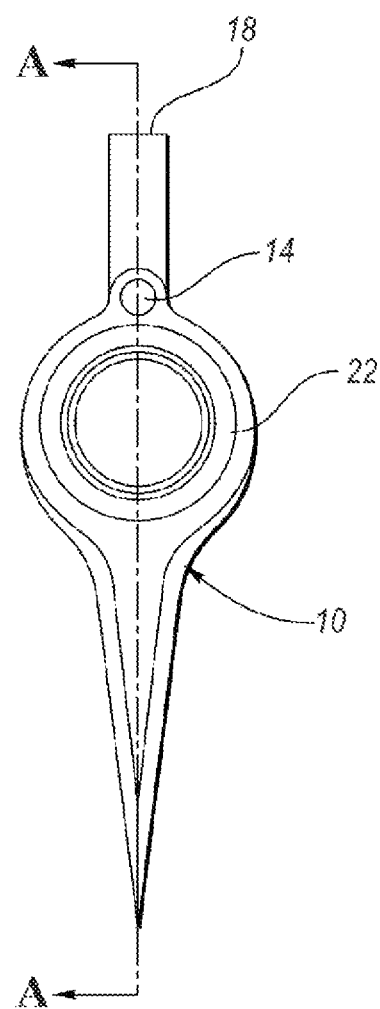
FIG. 4 shows a top view of the tool having a threaded attachment portion.

The top portion 12 may include an attachment portion 22, shown in FIG. 1A and cross-sectional view of FIG. 1B. The attachment portion 22 may be configured to accept an additional or second tool 100. The additional tool 100 may be a shaft, bar, rod, handle, paint roller, broom, or the like. The attachment portion 22 may have any suitable configuration or shape. The attachment portion 22 may be a recessed or hollowed-out portion of the body 11 of the tool 10. The attachment portion 22 may have any suitable shape, such as being shaped like a nook, cavity, crevice, niche, recess, pocket, or the like. A non-limiting example of an attachment portion 22 top view is shown in FIG. 4. The attachment portion 22 may be a threaded receiver, schematically shown in FIG. 4. The attachment portion 22 may be a cavity having dimensions such as depth d and width w. The dimensions may be configured to accommodate one or more types of tool 100. The dimensions may be set or adjustable.

In an alternative embodiment, the attachment portion 22 may protrude from the body 11 such that the attachment portion 22 exceeds one or more dimensions of the body 11. The attachment portion 22 may be attached to the body 11, for example, to the top portion 12. For example, the attachment portion 22 may include a track with a stop mounted on top of the top portion 12 of the body 11. The top portion 12 may be flat. The second tool 100 may include a part complimentary to the track such that the second tool 100 may be slidably attachable to the track against the stop.

The attachment portion 22 may be attached via one or more fasteners, adhesive, or a combination thereof. The attachment portion 22 may be molded, extruded, or formed by another method as a part of the body 11. Also, the attachment portion 22 may be a suitable receptacle(s) or attachment means, such as a bracket, attachable to the body 11 of the tool 10.

In yet another embodiment, the tool 10 may be free from an attachment portion 22 and the top portion 12 may extend into a shaft 102 operable by a user. The shaft 102 may be a rod, pole, handle, or the like. A non-limiting example of such embodiment is shown in FIG. 1C.

Figure 1G:
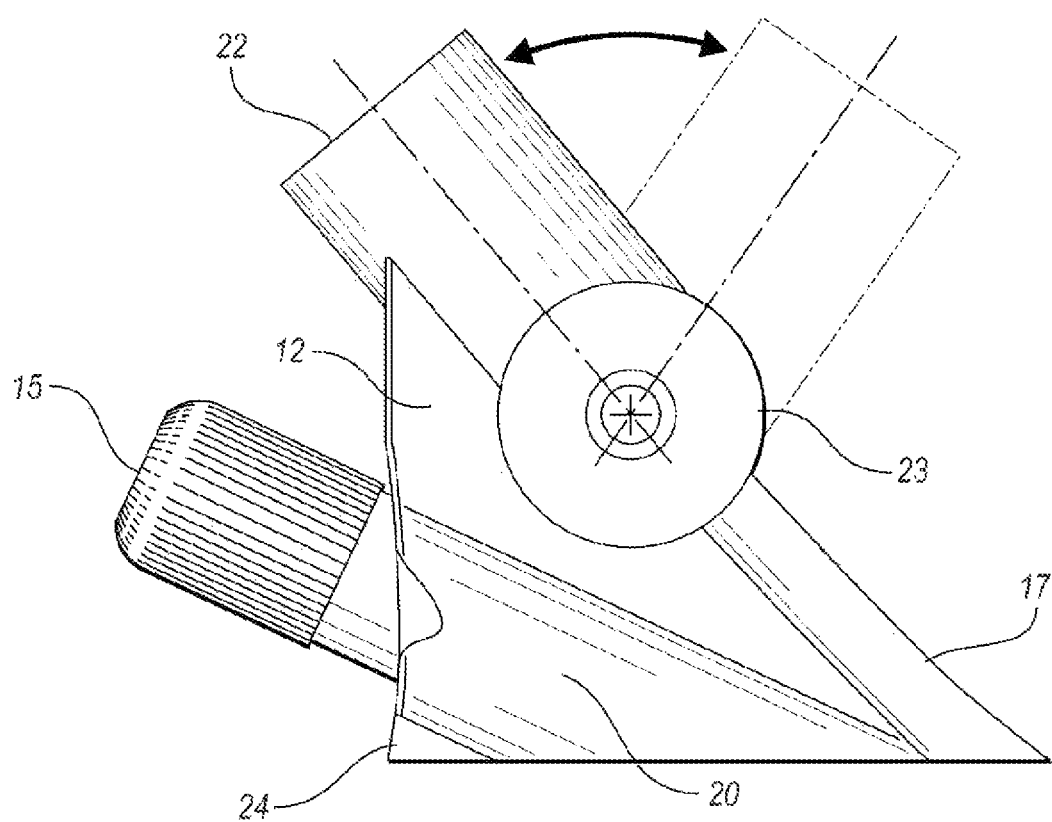
FIG. 1G shows an alternative version of a top portion of the tool.

While the attachment portion 22, the second tool 100, and/or the shaft 102 are shown leaning at an angle towards the front side of the tool 10, side 24, other arrangements are contemplated. For example, as can be seen in FIG. 1D, the attachment portion 22, the second tool 100, and/or the shaft 102 may be slanted in the opposite direction, leaning towards the back side of the tool 10, the side 17. Alternatively still, the angle at which the second tool 100, and/or the shaft 102, is positioned with respect to the body 11 may be adjustable such that the user may selectively choose an angle at which to set the second tool 100, and/or the shaft 102. A non-limiting example of such embodiment is shown in FIG. 1G. The angle may influence ease of movement of the tool 10 in the soil. The angle influences whether the user may move the tool 10 in the soil by a pushing or pulling movement.

As FIG. 1G shows, the selective angle may be achieved by providing a mechanism 23 allowing such selection. The mechanism 23 may be a hinge attached in the top portion 12 of the tool 10. The hinged connection 23 may be located above, adjacent to, or both with respect to the channel 20. For example, in FIG. 1G, the channel 20 is located below the hinged connection 23 of the attachment portion 22. The degree of flexibility may be about 10 to 180°, 20 to 150°, or 30 to 90°.

Figure 5:
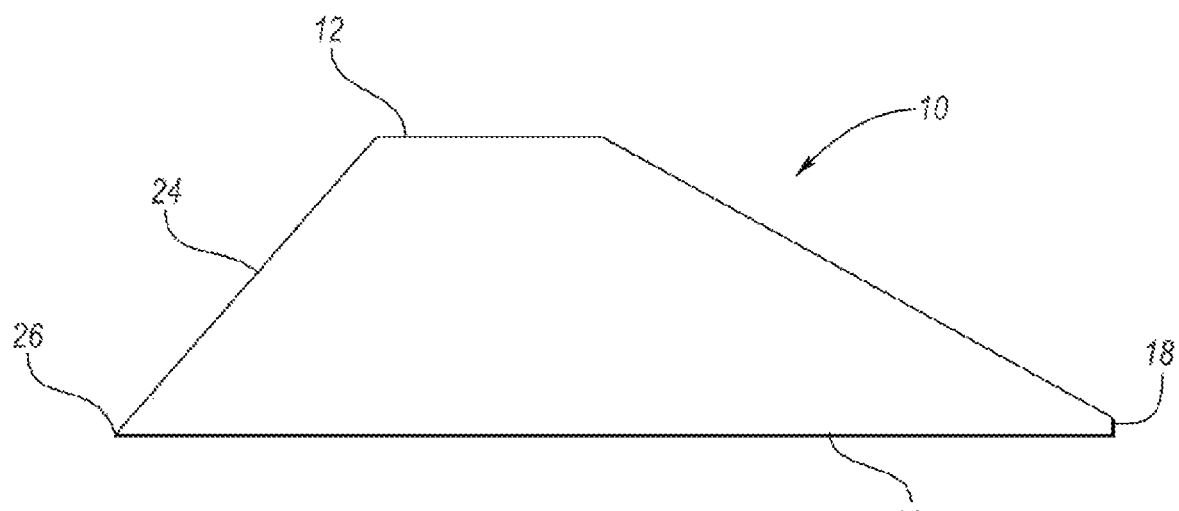
FIG. 5 shows another non-limiting example of the tool having a guide portion featuring no curves.

The tool 10 may include a guide portion 24, shown for example in FIGS. 1A through 1D. The guide portion 24 forms a front side of the tool 10. The guide portion 24 may have a curved or arcuate side 24 extending from the top portion 12 to the bottom portion 16. The curved guide portion 24 may be shaped like a bow. The guide portion may be concave-shaped. The guide portion may be convex-shaped. The guide portion 24 may be fin-shaped. In an alternative embodiment, shown in a non-limiting example of FIG. 5, the guide portion 24 may be a relatively straight side portion connecting the top portion 12 to the bottom portion 16, with the guide portion 24 having no curves. The guide portion 24 may have a sharp or pointy edge, such as a blade, along a portion or its entire length. The guide portion 24 may be located on the opposite side of the body 11 than the channel 20, as is shown for example in FIG. 1A. The channel 20 may be located, at least partially, on the guide portion 24 side. For example, the channel's top portion may be located on the guide portion 24 side and transition onto the back side 17. The channel 20 may originate at the bottom portion on the back side 17 and terminate at the guide portion side 24. The transition may be gradual. Such embodiment is shown, for example, in FIGS. 1E and 1F. The guide portion 24 may be configured to keep the tool 10 in its desired path, remove any undesirable debris in the tool's path, or both.

The guide portion 24 may terminate with an end portion or end point 26. The end portion 26 may be sharp, pointed, horned, jagged, serrated, spiky, needlelike, tapered, tipped, or dull. The end portion 26 may include one or more spikes or protrusions or serrations 27, example of which is shown schematically in FIG. 6A. The end portion 26 may be configured to move and/or cut through the soil, forming or sliding through a temporary gap or trench in the soil large enough to accommodate at least a lower portion 16 of the tool such that the tool 10 may slidably move through the soil and deposit the wire in the formed gap.

The guide portion 24 may further include a second end point 29. The second end point 29 may be blunt or sharp, pointed, horned, jagged, serrated, spiky, needlelike, tapered, tipped, or dull. A non-limiting example of the second end point 29 is shown in FIG. 1D.

The tool includes the bottom portion 16. The bottom portion 16 extends from the opening 18 to the end portion 26. The bottom portion 16 includes an edge 28. The edge 28 may be a sharp or pointy edge 28 along a portion or the entire length of the portion 16. The bottom portion 16 may have any suitable shape. For example, the bottom portion 16, or a portion of the bottom portion 16, may be shaped like a skating blade, leaf, having a cross-section of a rhombus, triangle, rectangle, leaf-linear, elongate with parallel margins, subulate—broad at the base tapering into a point, or the like. Non-limiting examples of the bottom portion 16 are shown in FIGS. 7A and 7B.

The dimensions of the body 11 may be uniform or non-uniform. For example, the bottom portion 16 may have the same thickness as the guide portion 24, the remainder of the body 11 except for the attachment portion 22 and the channel 20, as is shown in FIG. 8.

In another non-limiting example, shown in FIG. 9, the body 11 may have an edge 28 having a greater thickness than an inner portion of the body 11. The edge 28 forms a recessed portion of the body 11 having a smaller thickness than the edge 28 portion. The edge 28 portion may gradually or abruptly transition into the body portion 11 having a smaller thickness. The body 11 may gradually increase in thickness from the top portion 12 towards the bottom portion 16 or vice versa.

The example of FIG. 9 includes the channel 20 with a wide cross-section. The outer width $w_o$ of the channel 20 may command or compliment the width of the edge 28. The same width of the edge 28 may extend from the opening 18 to the point 26. The point 26 itself may have a relatively sharp tip. Alternatively, the outer width $w_o$ of the channel 20 may gradually decrease from the direction of the opening 18 to the point 26.

A portion of, or the entire length of, the side 24, side 17, the bottom portion 16, or their combination, may have the outer width $w_o$ of the channel 20, as can be seen in FIG. 9. Alternatively, the outer width $w_o$ of the channel 20 may have a greater width than a width of the side 17, 24, the bottom portion 16, their portions, or their combination.

The tool 10 may be used in any type of terrain and in any type of soil. For example, the tool 10 may be used in a flat, hilly, or mountainous terrain. The tool may be used in topsoil, sand, dirt, clay, silt, and the like.

The tool 10, or its portions, may be made from one type of material such as plastic. The plastic may be thermoplastic or thermoset. The plastic may be olefin-based such as polyethylene (PE), polypropylene (PP), polystyrene (PS), nylon, acrylonitrile butadiene styrene (ABC), or the like. The tool 10, or its portions, may be made from one or more composite materials. The tool 10, or its portions, may be made from ceramic. The tool 10, or its portions, may be made from metal. The tool 10 may be made from more than one part. The tool 10 may be made as a unitary piece expect for the wire assembly, the wire, the second tool 100, or a combination thereof.

A method of using the tool 10 is disclosed. The method may include installing a wire assembly 19 on the tool 10 or another tool 100 to be attached onto the tool 10. The method may further include leading, installing, or threading a free end of the wire from the wire assembly 19 via the opening 14 to the opening 18 of the channel 20. The installing may include leading the free end of the wire through the channel 20. The installing may include leading the free end of the wire through the entire length of the channel 20 or through a portion of the channel 20 or under the bridges. The installing may result in the free end of the wire resting at a point where the wire exits the channel 20.

The method may also include attaching a second or additional tool 100 into the tool 10. The second tool 100 may be inserted, screwed, or otherwise secured into the attachment portion 22 of the tool. An example second tool 100 may be a shaft. Alternatively, this step may be omitted if the shaft 102 is present.

The method may further include preparing the sod, flower bed, or another type of terrain where the wire installation is desired. The preparing may include marking a line, cutting the line, or forming a shallow trench, into a depth of a few to several inches to mark where the installation is desired. A non-limiting example depth may be about 0.5, 1, 1.5, 2, 2.5, 3, or more inches. The cutting, marking may be done, for example, with a lawn edger, knife, or another sharp object including the tool's point 26. The method may also include inserting the tool 10 into the ground to the depth of the cut where the cut initiates. The inserting may include placing the tool into the marked cutline with the point 26 followed by placing the bottom portion 16 such that a portion of the bottom portion 16 is fully inserted in the ground and the top portion 12 with the tool 100 or the shaft 102 is upward, facing away from the ground such that the tool 10 may be operated by a user.

The method may further include leading the tool 10, point 26 and side 24 forward, in the marked line or cut, just underneath the terrain. The leading may include sliding, dragging, pushing, or pulling the tool 10 in the direction in which the user desires to deposit the wire. As the tool 10 proceeds forward under the terrain, the guide portion 24 is moving ahead of the channel 20 releasing the wire, or wires, at the desired depth. As the tool 10 proceeds forward under the terrain, the wire assembly 19, including the spool, keeps unwinding the wire, and the wire keeps being dispensed and released into the desired layer underground and deposited therein. As the tool 10 moves forward, in the direction in which the user desires to deposit the wire, the cut does or may not extend in width, but may rather close above the deposited wire. The method may include enclosing the cut with an object after the wire is deposited and the tool 10 is removed.

The method may include securing the initial portion of the free end of the wire in the initial deposition site. The securing may be, for example, with hardware such as a hook, knob, or by other means. The deposition method may be applied to any type of terrain. Upon completing the desired trajectory, the wire may be cut, the tool removed from the cutline, and the wire may be secured in the ground according to the desired application.

The method may be free of marking, pre-marking, preparing the entire desired trajectory. Instead, the tool 10 may be inserted in the ground and lead in the desired direction. This may be practicable in a type of soil with minimal resistance such as dry sand.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An in-ground wire installation tool comprising:
   a body having
      a concave-shaped side with a pointed edge;
      an opposing side including a channel configured to dispense a wire, the concave-shaped side and the opposing side being connected via a top portion and a bottom portion,
      the top portion including an attachment portion configured to house a shaft; and
      the bottom portion connecting the concave-shaped side and the channel, the bottom portion having a blade, the bottom portion terminating in a point on the concave-shaped side and having an enlarged bulbous portion between the concave-shaped side and the opposing side including the channel; and
   a wire assembly configured to include an open spool of wire.

2. The tool of claim 1, wherein the attachment portion is immediately adjacent to the channel.

3. The tool of claim 1, wherein the channel is a curved elongated channel.

4. The tool of claim 1, wherein the attachment portion includes a screw-thread.

5. The tool of claim 1, wherein the body is fin-shaped.

6. The tool of claim 1, wherein the blade runs along an entire length of the bottom portion.

7. The tool of claim 1, wherein the channel has a rectangular cross-section.

8. The tool of claim 1, wherein the concaved-shaped side includes serrations.

9. The tool of claim 1, wherein the channel is open on one side and includes one or more bridges.

10. An in-ground wire installation tool comprising:
    a body having:
       a top portion;
       a bottom portion;
       a first side terminating in a blade;
       a second side, opposite the first side, the second side having an integral channel configured to dispense a wire;
    the body configured to receive a shaft for driving the tool, the shaft leaning at an angle towards the first side; and
    wherein the bottom portion is disposed between the first side and the second side terminates in a point on the first side, and includes an enlarged bulbous portion between the first side and the second side.

11. The tool of claim 10, wherein the body includes an attachment portion configured to receive the shaft.

12. The tool of claim 10, wherein the body includes a rim having a greater thickness than the rest of the body.

13. The tool of claim 10, wherein the channel runs from the bottom portion towards the top portion.

14. The tool of claim 10, wherein the side terminating with a blade includes a curvature.

15. An in-ground wire installation tool comprising:
    a body having:
       a top portion;
       a bottom portion;
       a first side having a blade;
       a second side, opposite the first side, the second side having a channel originating at the bottom portion and terminating at the first side, the channel configured to dispense a wire;
    the body including an attachment portion, located in the top portion, configured to receive a shaft for driving the tool; and wherein the bottom portion connects the first side and the second side, terminates in a point on the first side, and has an enlarged bulbous portion between the first side and second side such that the channel terminates at a portion opposite the point formed in the blade of the first side.

16. The tool of claim 15, wherein the channel is an elongated straight channel.

17. The tool of claim 15, wherein the attachment portion is located above the channel.

18. The tool of claim 15, wherein the first side has a sharp edge along its length.

19. The tool of claim 15 further comprising a sleeve insertable into the channel.

20. The tool of claim 19, wherein the sleeve includes a securing mechanism adapted to lock the sleeve in a position once inserted in the channel.

* * * * *